United States Patent [19]

Garnett et al.

[11] Patent Number: 5,655,709

[45] Date of Patent: Aug. 12, 1997

[54] ELECTRICAL CONTROL SYSTEM FOR RELAY OPERATION RESPONSIVE TO THERMOSTAT INPUT HAVING IMPROVED EFFICIENCY

[75] Inventors: Ronald E. Garnett, Lexington; Walter H. Bailey, Versailles, both of Ky.

[73] Assignee: Texas Instruments Incorporated, Dallas, Tex.

[21] Appl. No.: 654,803

[22] Filed: May 29, 1996

[51] Int. Cl.$^6$ ........................................ G05D 15/00
[52] U.S. Cl. ........................... 236/68 B; 219/511
[58] Field of Search ........................ 236/68 R, 68 B, 236/68 C, 1 E; 237/2 A, 2 R; 219/511; 337/324, 377

[56] References Cited

U.S. PATENT DOCUMENTS

| | | | |
|---|---|---|---|
| 4,277,670 | 7/1981 | Mori et al. | 219/511 X |
| 4,315,142 | 2/1982 | Henault | 219/511 |
| 5,039,010 | 8/1991 | Juntunen | 236/68 B X |
| 5,467,920 | 11/1995 | Porter | 236/68 B |
| 5,530,615 | 6/1996 | Miller et al. | |

Primary Examiner—Harry B. Tanner
Attorney, Agent, or Firm—Russell E. Baumann; Richard L. Donaldson; René E. Grossman

[57] ABSTRACT

A temperature control system is shown in which a thermostat circuit is combined with a power supply to produce a higher anticipator current for a W1 signal while reducing power consumption and heat generation of the circuit. A first relay power signal is provided by an unbalanced bridge rectifier (D1, D2, D3, D4, D7, D8) while current drawn through the anticipator resistor (AR1) by means of an additional bridge rectifier circuit (D7, D8, D9, D10) is merged with the first relay power signal. In a second embodiment, an unbalanced bridge rectifier (D1, D4, D7, D2, D3, D8) has an output connected to a first stage relay power signal line as well as to second and third relay power signal lines. A second stage of the power supply includes a first additional bridge rectifier (D5, D6, D7, D8) connected to the second relay power signal line that drives current through the W1 anticipator while in a third stage of the power supply a second additional rectifier (D20, D21, D7, D8) is connected to the third relay power signal line and draws current through the W2 anticipator. Each stage of power adds more capacitance (C12, C11, C10) as the power requirements increase.

19 Claims, 7 Drawing Sheets

ELECTRICAL CONTROL SYSTEM FOR RELAY OPERATION RESPONSIVE TO THERMOSTAT INPUT HAVING IMPROVED EFFICIENCY

BACKGROUND OF THE INVENTION

This invention relates generally to electronic temperature control systems and more particularly to electronic control systems for controlling relay operation in response to inputs from a thermostat. The relays in turn control a fan motor and heat generators such as electric heating banks.

In one prior art system currently in use, a fan motor and a plurality of banks of heater elements are driven through relays under the control of a microprocessor in response to low voltage AC input signals W1, W2, Y and G from a wall thermostat where G is the continuous fan signal, Y is the heat pump or air conditioner compressor signal, and W1 and W2 are the first and second stage electric heat signals, respectively. Such heat thermostats require a minimum load on W1 of 100 mA which is normally dissipated through power resistors on the furnace control board resulting in dissipation of at least 2.4 watts of heat. The dissipation of this heat is facilitated by increasing the surface area of the resistors by placing a plurality of resistors in parallel circuit arrangement between the W1 line and ground to draw the minimum required current. Although this prior art system functions effectively, the 2.4 watts represent wasted energy as well as requiring a special arrangement to allow for heat dissipation.

SUMMARY OF THE INVENTION

An object of the present invention is the provision of an electronic temperature control system which overcomes the above noted prior art limitations. Another object of the invention is the provision of a microprocessor temperature control system which is of relatively low cost, reliable and one having reduced heat and power requirements.

Briefly, in accordance with a first embodiment of the invention, a temperature control system includes a plurality of electric relays under the control of a microprocessor. A thermostat has a switch serially connected to a variable anticipator resistor in a low voltage AC signal line providing an input to the microprocessor. A first unbalanced bridge rectifier has an input connected to a low voltage AC source and an output connected to the relay coils providing a relay power signal under the control of the microprocessor. The low voltage AC signal is also connected through an additional balanced bridge rectifier with the relay power signal. In this arrangement heat is dissipated in the relay coils instead of in a low value resistor. A system made in accordance with this embodiment results in anticipator resistor current proportional to the number of relays energized instead of a fixed value and tends to prevent overshoot during a heat mode. Further, a greater anticipator power range is provided with no additional power lost.

According to a second embodiment of the invention, the low voltage AC source is connected to the input of the first unbalanced bridge rectifier with the output of the rectifier connected to first, second, and third relay power signal lines. First and second switches of the thermostat are serially connected to variable anticipator resistors in respective first and second low voltage AC signal lines which are connected to the input of respective first and second additional balanced rectifier bridges. The output of the first additional rectifier bridge is merged with the first relay power signal to form a second stage relay power signal and the output of the second additional rectifier bridge is merged with the second relay power signal to form a third stage relay power signal. The three signals each drive independent stages with additional capacitance added to the circuit with each stage increasing the RMS current as the power requirements increase.

In the second embodiment the second anticipator resistor shares the power supply load current more evenly with the first anticipator resistor. The power supply is also more evenly staged so that the RMS voltage of the power supply is somewhat proportional to the number of operating relays.

DETAILED DESCRIPTION OF THE DRAWINGS

Figure 1A:
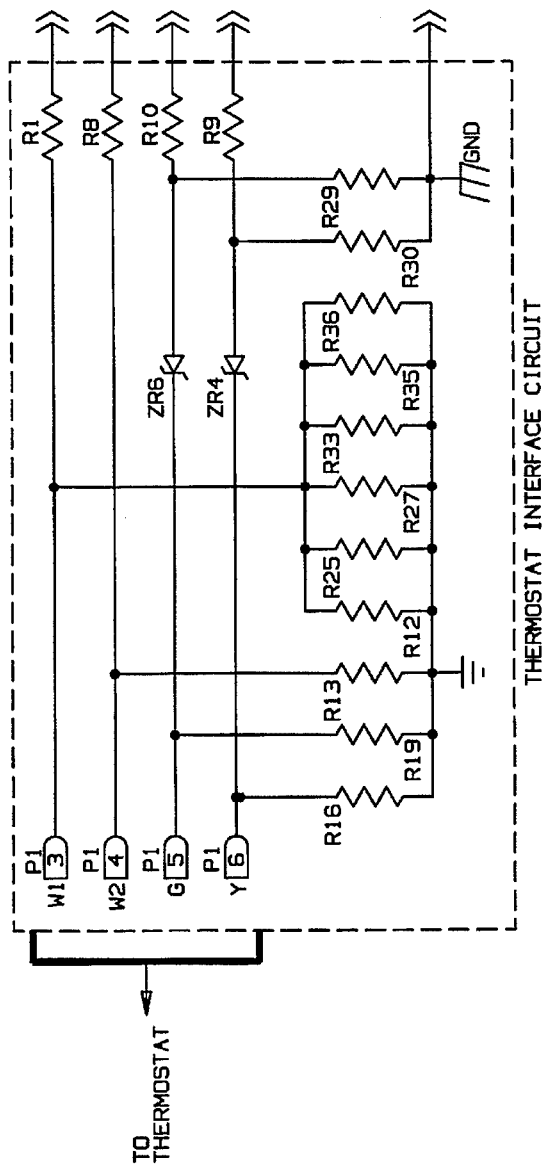
FIG. 1 shows the arrangement of FIGS. 1a and 1b which are portions of a single schematic of a prior art system, FIG. 1a showing a thermostat interface circuit and FIG. 1b showing a microprocessor and a relay output section.
FIG. 1c is a schematic of a power supply circuit used with the FIGS. 1a, 1b system.
Figure 1B:
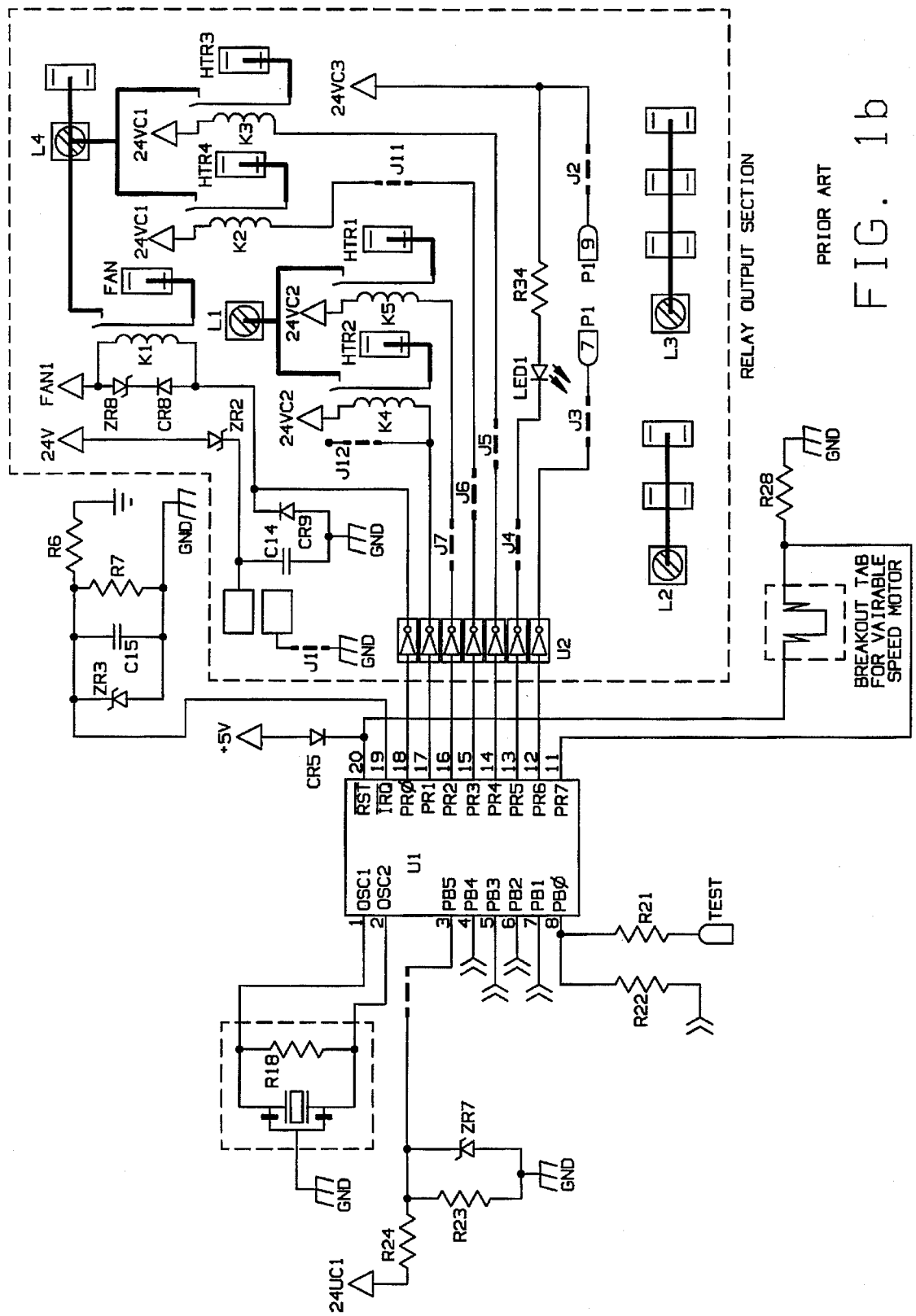
Figure 1C:
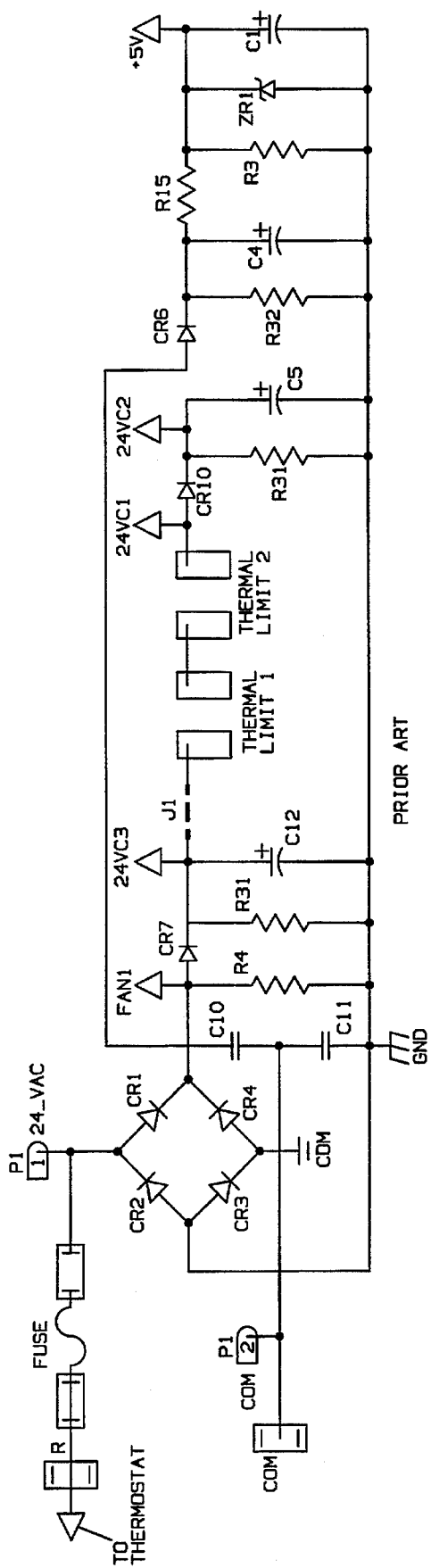
Figure 3:
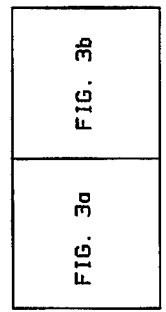
FIG. 3 shows the arrangement of FIGS. 3a and 3b which are portions of a single schematic of a temperature control system made in accordance with a first embodiment of the invention, FIG. 3a showing a portion of a combined thermostat and power supply circuit and FIG. 3b showing the remaining portion of the FIG. 3a circuit, a microprocessor and a relay output circuit.

FIGS. 1a, 1b, and 1c show a prior art temperature control circuit used to drive up to four external banks of heater elements and an external fan. The relays which drive the heater elements are switched, for example, as taught in copending U.S. patent application Ser. No. 08/163,782, U.S. Pat. No. 5,530,615 assigned to the assignee of the present invention, the subject matter of which is incorporated herein by this reference. According to that patent application, low voltage AC control inputs are inputted to a microprocessor along with an input from AC common to the IRQ input of the microprocessor to synchronize the readings of the low voltage AC signals. When used with resistive loads, a first time constant corresponding to the amount of time which occurs between an output signal of the microprocessor to energize a relay to move the contacts into engagement and the time that the contacts actually come into engagement is used to derive a time delay. This time delay is used with the status of the wave determined through the IRQ port to effect the closing of the contacts synchronously at a selected point of the AC wave form at or shortly before a zero crossing. A second time constant corresponding to the amount of time which occurs between an output signal of the microprocessor to de-energize the relay to move the contacts into disengagement is used to derive a second time delay. The second time delay is used with the status of the wave determined through the IRQ port to effect the opening of contacts at a selected point of the AC wave form at or shortly before a zero crossing. This switching technique provides improved relay life.

In the system of FIGS. 1a, 1b, and 1c, one to five relays can be operated at the same time in response to inputs from the wall thermostat, but only one relay is turned on in any 0.25 second window. The order of relay activation is predictable. When all five relays are operating, the RMS voltage of the relay power supply is lower than it would be if only one relay were operating. Since relays require a higher voltage to pull in their contacts than they require to maintain contact closure, the last relay is the most difficult relay to pull in across the voltage range of the product. Capacitance can be added to the power supply to increase the available RMS voltage, thus increasing the ability of the last relay to pull in but it also increases the amount of heat which the relay coils generate when only one of the relays is operating. Thus, a tradeoff is made to allow proper operation across the voltage range of the board and to keep the relay heat low enough so as to not violate relay specifications or agency rules. This is accomplished by using a multi-stage power supply shown in FIG. 1c comprising FAN1, 24VC3, 24VC1, and 24VC2. Since the fan relay is always the first relay to operate, it has the lowest RMS supply (FAN1).

Figure 2:
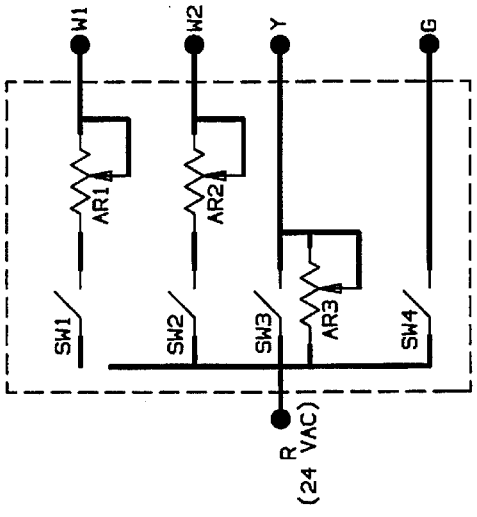
FIG. 2 is a simplified wall thermostat schematic.

FIG. 2 shows a schematic of a simplified typical wall thermostat 10 coupled to R, a 24 VAC source. Thermostat 10 has a first switch SW1 connected through a variable anticipator resistor AR1 to W1, a second switch SW2 connected through a variable anticipator resistor AR2 to W2, a third switch SW3 connected in parallel with a variable anticipator resistor AR3 to Y and a switch SW4 connected to G.

As shown in FIG. 1c, a nominal voltage of 24 volts AC RMS (as referenced to earth ground common supplied through connector P1, pin 2) is supplied to the circuit board via connector P1, and is then sent to the wall thermostat through a 5 amp fuse as the signal called R. 24 VAC is also rectified by the full wave bridge rectifier consisting of diodes CR1, CR2, CR3, and CR4 to become the pulsed DC relay drive voltage called FAN1. Capacitors C10 and C11 and resistor R4 provide EMI noise suppression. Diode CR7, capacitor C12, and resistor R31 rectify and filter FAN1 to make a second relay drive power supply with a higher RMS voltage called 24VC3 which then passes through two thermal limit switches to become the 24VC1 relay drive voltage. Diode CR10, capacitor C5, and resistor R37 rectify and filter 24VC1 to make a third relay drive power supply with an even higher RMS voltage called 24VC2.

The FAN1 power supply is conditioned by diode CR6, resistor R32, capacitor C4, resistors R15, R3, zener diode ZR1, and capacitor C1 to become a lower DC voltage called +5 V which is used for the microprocessor and related circuitry.

The thermostat signals W1, W2, G, and Y (FIG. 1a) enter the board through P1, pins 3, 4, 5, and 6 respectively. Resistor R16 draws current through the Y circuit of the thermostat and is present for compatibility with electronic thermostats and the "Y" anticipator resistor. Resistor R19 draws current through the "G" circuit of the thermostat and is present for compatibility with electronic thermostats. Resistor R13 draws a minimal amount of current through the W2 circuit of the thermostat to provide compatibility with electronic thermostats. Resistors R12, R25, R27, R33, R35, and R36 draw current through the W1 anticipator circuit and likewise provide compatibility with electronic thermostats. Six parallel resistors are used instead of one resistor in order to provide more surface area for heat dissipation. The RMS current flowing through the heat anticipator is approximately equal to the applied thermostat voltage (24 VAC nominal) divided by 250 ohms. At nominal voltage, the RMS current is approximately 96 mA. This wastes approximately 2.3 watts of power and occupies considerable circuit board space in order to dissipate the heat.

Zener diode ZR4 and Resistor R30 provide a voltage dropping circuit for the Y signal for electronic thermostat compatibility while zener diode ZR6 and resistor R29 perform a similar function for the G signal. Resistors R1, R8, R10, and R9 provide a voltage drop and act as current limiting resistors for the W1, W2, G, and the Y signals respectively.

U1 is a microprocessor which uses inputs from the thermostat, the limit circuit, the power supply, and the configuration circuits to produce outputs through the relay output circuitry. Resistors R24, R23 and zener diode ZR7 provide a voltage dropping and current limiting circuit for the 24VC1 signal. This is used to sense the status of the thermal limit switches. The OSC oscillator and resistor R18 provide the clock signal for the microprocessor. Diode CR5 connects +5 V to the reset pin on the microprocessor and also connects +5 V through a breakout configuration tab to the microprocessor and then through resistor R28 to ground. Resistor R28 is also connected to the microprocessor. Resistors R6, R7, capacitor C15, and zener diode ZR3 form a voltage dropping, current limiting, and filtering circuit for the COM signal to form the IRQ signal for the microprocessor. Resistors R21 and R22 provide a voltage dropping, current limiting circuit for the 24 VAC TEST signal for the microprocessor.

U2 is a relay driver chip used to buffer the microprocessor output signals. P1, pin 7 is driven by U2 and, in conjunction with the 24VC3 signal on P1, pin 9, provides power to an external relay. Light emitting diode LED1 is driven by U2 and is used to indicate the status of the control. Resistor R34 limits the current into diode LED1. The K1 relay is used to drive an external fan and relays K2, K3, K4, and K5 are used to drive external heater banks. K1, K2, K3, K4, and K5 relays are driven by U2. Capacitor C14 and diode CR9 provide flyback protection for U2. Zener diode ZR2 is used to clamp the relay flyback voltage from all relays to 43 V above 24VC3. Diode CR8 and zener diode ZR8 are used to clamp the K1 relay flyback voltage to approximately 6 volts. Various terminal blocks and quick connect terminals are used to connect the relay outputs to the external system.

Although the above system functions effectively, as mentioned supra, it is desirable to reduce power wasted via heat dissipated by the parallel resistor arrangement as well as to minimize circuit board space.

Figure 3A:
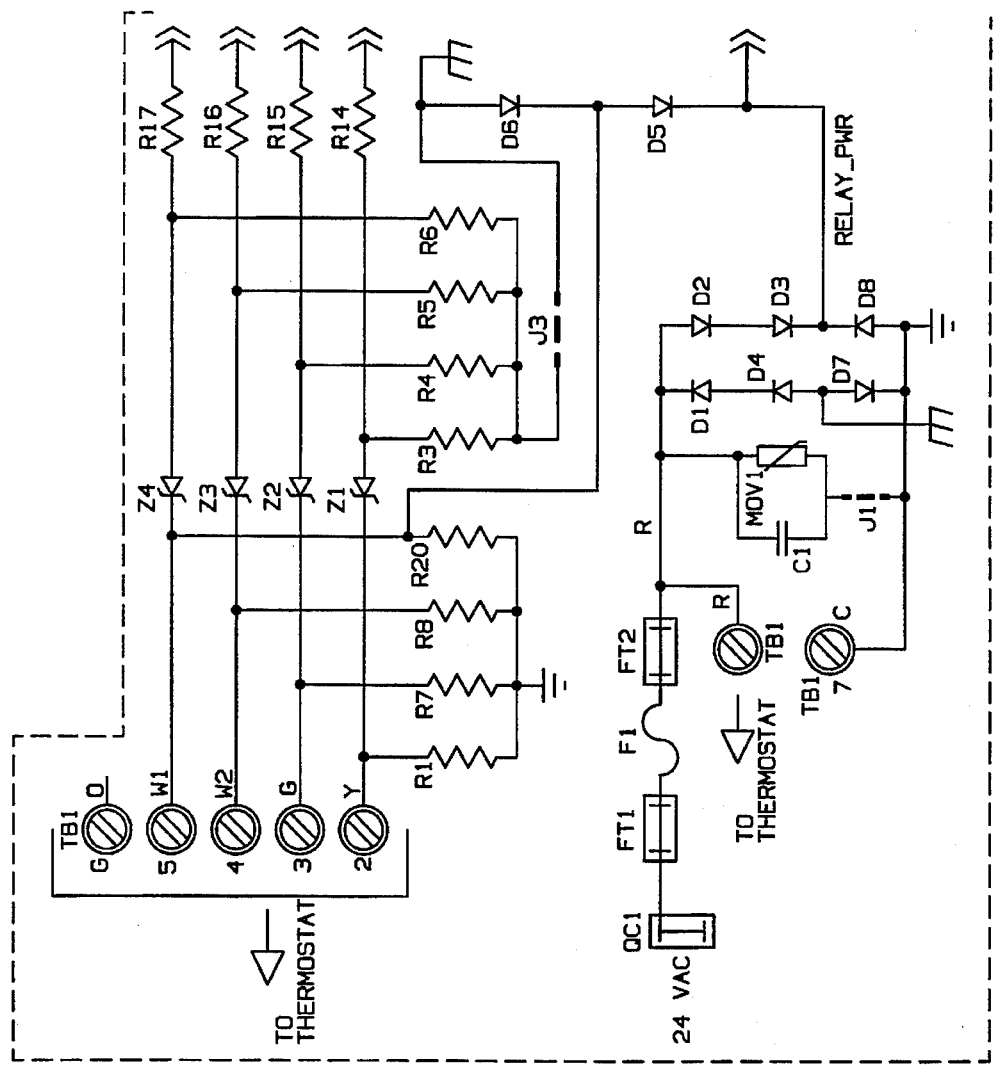
Figure 3B:
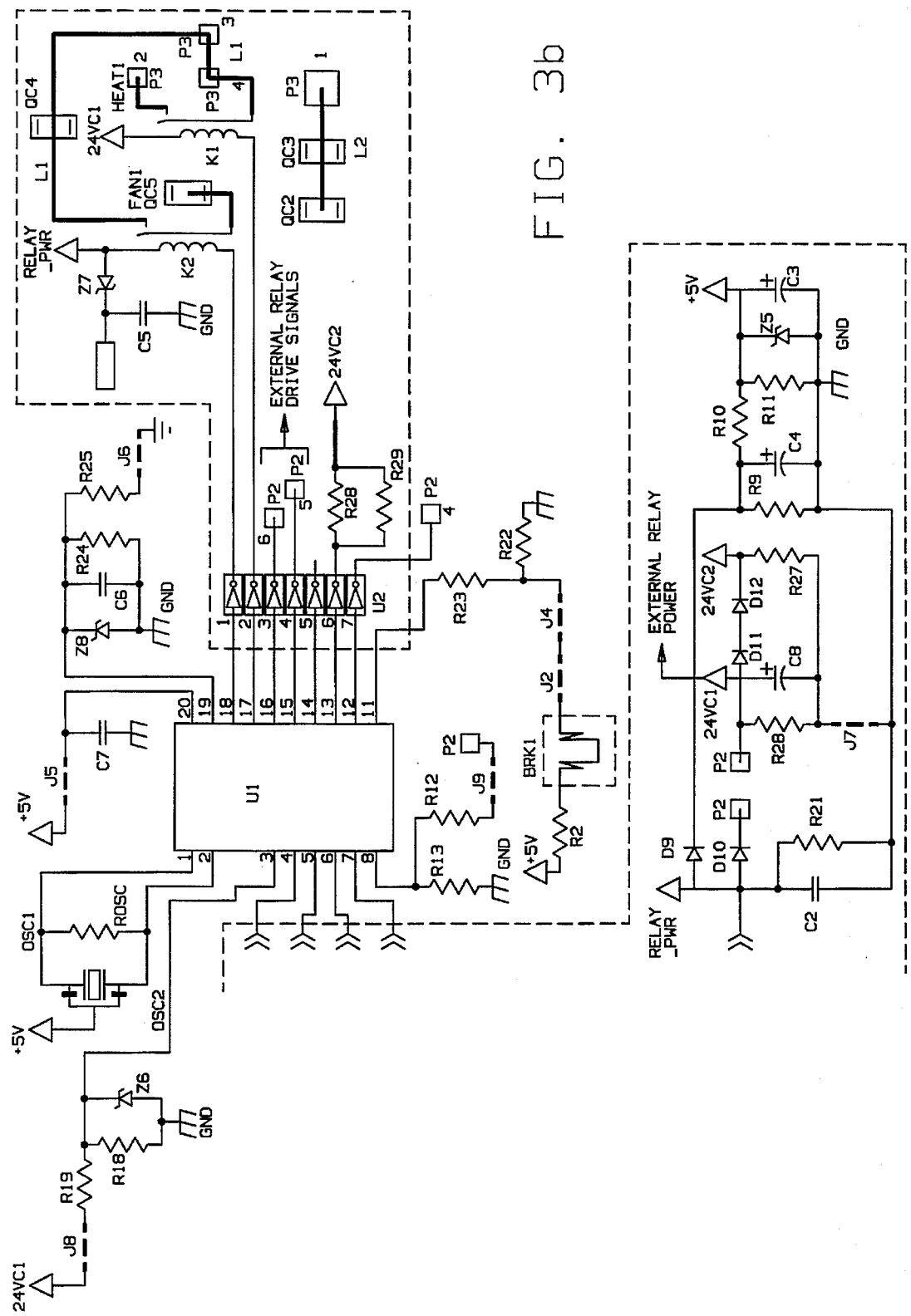

In accordance with a first embodiment of the invention, as seen in FIGS. 3a, 3b, the thermostat circuit is combined with the power supply to produce higher anticipator current for the W1 signal while reducing the power consumption and heat generation of the circuit. The new anticipator current is proportional to the number of active resistive heat banks instead of being a fixed value which helps prevent overshoot during heat mode. These key changes are in the area of diodes D1–D8.

A nominal voltage of 24 volts AC RMS is supplied to the circuit board via connector QC1 through fuse F1 to become the signal R which is also sent to the thermostat via TB1 (screw terminal block), terminal No. 1. Earth common ground, labeled C, is connected to the circuit through TB1, terminal No. 7. Capacitor C1 and varistor MOV1 provide EMI noise suppression. Diodes D1, D4, D7, D2, D3, and D8 form an unbalanced bridge rectifier that produces the pulsed DC signal called RELAY_PWR. Diodes D5, D6, D7, and D8 form a second, balanced bridge rectifier that draws current through the W1 anticipator resistor and which also feeds RELAY_PWR. During the half cycle of the line voltage in which R and W1 are positive with respect to common ground C, the series combination of diodes D2 and D3 is essentially in parallel with the series combination of diode D5 and the anticipator resistor. For that reason, diodes D2 and D3 will not start to conduct until the voltage developed across the anticipator resistor is equal to a single, on-state diode voltage drop (nominally 0.7 volts). During the negative half cycle of the line voltage with respect to common, the series combination of diodes D1 and D4 is essentially in parallel with the series combination of diode D6 and the anticipator resistor so that the anticipator conducts an equivalent current to that conducted during the positive half cycle. As more heater banks are turned on, the load on the power supply increases as does the anticipator current until the voltage drop across the anticipator reaches the on-state diode voltage drop at which time the power supply load is shared by both bridge rectifier circuits. Thus the total current flowing through the W1 anticipator is approximately equal to the lesser of either the total power supply current load or 0.7 volts divided by the anticipator resistor. The RELAY_PWR and 24 VC1 power signals are merged together through diode logic to form a single relay power signal.

The DC RELAY_PWR signal is filtered by capacitor C2 and resistor R21, then rectified by diode D10 and sent out of connector P2, pin 3 to the thermal limit switch(es) before coming back into the circuit at P2, pin 3 and being further filtered by capacitor C8 and resistor R26 to become the higher RMS voltage signal called 24VC1. 24VC1 is also used to power external relays which switch additional heater elements and is routed through diodes D11 and D12 to become a lower RMS signal, 24VC2. Diode D9 routes RELAY_PWR to the +5 V DC power supply consisting of resistor R9, capacitor C4, resistors R10, R11, zener diode Z5, and capacitor C3.

The thermostat signals W1, W2, G, and Y enter the board through TB1, pins 5, 4, 3, and 2 respectively. Resistor R1 draws current through the Y circuit of the thermostat and is present for compatibility with electronic thermostats and the Y anticipator resistors. Resistor R7 draws a current through the G circuit of the thermostat and is present for compatibility with electronic thermostats. Resistor R8 draws a minimal amount of current through the W2 circuit of the thermostat. Resistor R20 draws current through the W1 circuit to provide compatibility with electronic thermostats.

Zener diodes Z1–Z4 in conjunction with resistors R3–R6 and resistors R14–R17 provide voltage dropping and current limiting circuits for the Y, G, W2, and W1 signals respectively for electronic thermostat compatibility and EMI protection.

U1 is a microprocessor which uses inputs from the thermostat, the limit circuit, the power supply, and configuration circuits to produce outputs through the relay output circuitry. Resistors R19, R18, and zener diode Z6 provide a voltage dropping and current limiting circuit for the 24VC1 signal. This is used to sense the status of the thermal limit switches. The OSC1 oscillator and ROSC resistor provide the clock signal for the microprocessor. The +5 V source connects to the reset pin on the microprocessor and is filtered by capacitor C7 for EMI noise immunity. The +5 V source is also routed though resistor R2 to a breakout configuration tab and through resistor R23 to the microprocessor. Resistor R22 acts as a pull down resistor on the junction of the breakout tab and resistor R23. Resistors R25, R24, capacitor C6, and zener diode Z8 form a voltage dropping, current limiting, and filtering circuit for the C signal to form the IRQ signal for the microprocessor. Resistors R12 and R13 provide a voltage dropping, current limiting circuit for the 24 VAC TEST signal for the microprocessor.

U2 is a relay driver chip used to buffer the microprocessor output signals. P2, pin 4 is driven by U2 and, in conjunction with the RELAY_PWR signal on P2, pin 3, provides power to an external fan control relay. Resistors R28 and R29 are used to reduce the RMS voltage of 24VC2 and the various relay power supplies to reduce heating after the relays are pulled in. K1 and K2 relays are driven by U2. U2 also drives external heater relays via P2, pins 5 and 6. Capacitor C5 and zener diode Z7 provide flyback protection for U2. Various terminal blocks and quick connect terminals are used to connect the relay outputs to the external system.

Thus, as described, the invention results in heat being dissipated in the relay coils instead of in a low value resistor. Voltage across the anticipator is equal to one diode voltage drop and the power dissipated becomes approximately $$\frac{(.7 \text{ volts})^2}{R_{anticipator}}$$

instead of $(100 \text{ mA})2$. $R_{anticipator}$ instead of $(100 \text{ mA})^2$. $R_{anticipator}$. With a normal range for $R_{anticipator}$ of 0.1 to 8 ohms, the ranges of power are as follows:

| $R_{anticipator}$ | Prior Art | FIGS. 3a, 3b |
|---|---|---|
| 0.1 | 1mW | 4.9W |
| 8 | 80mW | 61.3mW |

The invention, therefore, provides a greater anticipator range with no additional power loss.

A temperature control system made in accordance with the FIGS. 3a, 3b embodiment comprised the following components:

| | | | | |
|---|---|---|---|---|
| C1 | .1 uF | 100VDC | 20% | .1 uF, 100 V FILM CAP |
| C2 | .1uF | 100VDC | 20% | .1 uF, 100 V FILM CAP |
| C3 | 10uF | 16V | 5% | 10 uF ELECTL RAD CAPS |
| C4 | 47uF | 50V | 20% | 47 uF ELECTL RAD CAPS |
| C5 | .1uF | 100VDC | 20% | .1 uF, 100 V FILM CAP |
| C6 | .01uF | 50V | 20% | CERM CAP Z5U .01 |
| C7 | .1uF | 50V | 20% | CERM CAP Z5U .1 |
| C8 | 33uF | 50V | 20% | 33uF ELECTL RAD CAPS |
| D1 | 1N4007 | 1AMP | | 1N4007 DIODE |
| D2 | 1N4007 | 1AMP | | 1N4007 DIODE |
| D3 | 1N4007 | 1AMP | | 1N4007 DIODE |
| D4 | 1N4007 | 1AMP | | 1N4007 DIODE |
| D5 | 1N4007 | 1AMP | | 1N4007 DIODE |
| D6 | 1N4007 | 1AMP | | 1N4007 DIODE |
| D7 | 1N4007 | 1AMP | | 1N4007 DIODE |
| D8 | 1N4007 | 1AMP | | 1N4007 DIODE |
| D9 | 1N4007 | 1AMP | | 1N4007 DIODE |
| D10 | 1N4007 | 1AMP | | 1N4007 DIODE |
| D11 | 1N4007 | 1AMP | | 1N4007 DIODE |
| D12 | 1N4007 | 1AMP | | 1N4007 DIODE |
| FT1 | 1/4FVERT | | | VERT FUSE TERMINAL |
| FT2 | 1/4FVERT | | | VERT FUSE TERMINAL |
| F1 | 5AMP | | | .5 AMP FUSE |
| MOV1 | SO5K35 | 35V | | MOV FOR 24VAC APPS (SIEMENS) |
| ROSC | 39K | 1/8W | | 5% RES, 1/8W, 5% |
| R1 | 1.5K | 2W | | 5% RES, 2W, 5% |
| R2 | 2K | 1/8W | | 5% RES, 1/8W, 5% |
| R3 | 10K | 1/8W | | 5% RES, 1/8W, 5% |
| R4 | 10K | 1/8W | | 5% RES, 1/8W, 5% |
| R5 | 10K | 1/8W | | 5% RES, 1/8W, 5% |
| R6 | 10K | 1/8W | | 5% RES, 1/8W, 5% |
| R7 | 1.5K | 2W | | 5% RES, 2W, 5% |
| R8 | 10.0K | 1/4W | | 1% RES, 1/4W, 1% |
| R9 | 10.0K | 1/4W | | 1% RES, 1/4W, 1% |
| R10 | 1.5K | 2W | | 5% RES, 2W, 5% |
| R11 | 2K | 1/8W | | 5% RES, 1/8W, 5% |
| R12 | 100K | 1/8W | | 5% RES, 1/8W, 5% |

-continued

| | | | | |
|---|---|---|---|---|
| R13 | 51K | 1/8W | | 5% RES, 1/8W, 5% |
| R14 | 100K | 1/8W | | 5% RES, 1/8W, 5% |
| R15 | 100K | 1/8W | | 5% RES, 1/8W, 5% |
| R16 | 100K | 1/8W | | 5% RES, 1/8W, 5% |
| R17 | 100K | 1/8W | | 5% RES, 1/8W, 5% |
| R18 | 51K | 1/8W | | 5% RES, 1/8W, 5% |
| R19 | 10.0K | 1/4W | | 1% RES, 1/4W, 1% |
| R20 | 1.5K | 2W | | 5% RES, 2W, 5% |
| R21 | 10.0K | 1/4W | | 1% RES, 1/4W, 1% |
| R22 | 51K | 1/8W | | 5% RES, 1/8W, 5% |
| R23 | 51K | 1/8W | | 5 W. RES, 1/8W, 5% |
| R24 | 100K | 1/8W | | 5% RES, 1/8W, 5% |
| R25 | 10K | 1/8W | | 5% RES, 1/8W, 5% |
| R26 | 10.0K | 1/4W | | 1% RES, 1/4W, 1% |
| R27 | 10.0K | 1/4W | | 1% RES, 1/4W, 1% |
| R28 | 1.0K | 2W | | 5% RES, 2W, 5% |
| R29 | 1.0K | 2W | | 5% RES, 2W, 5% |
| U1 | 68HC05J1 | 6EH | | 6EH MICROCONTROLLER REV B1 |
| U2 | ULN2003A | 50V | | ULN 2003A RELAY DRIVER |
| Z1 | 12V | 1/2W | 5% | ZENER DIODE 5% .5W |
| Z2 | 12V | 1/2W | 5% | ZENER DIODE 5% .5W |
| Z3 | 12V | 1/2W | 5% | ZENER DIODE 5% .5W |
| Z4 | 12V | 1/2W | 5% | ZENER DIODE 5% .5W |
| Z5 | 5.1V | 1/2W | 5% | ZENER DIODE 5% .5W |
| Z6 | 5.1V | 1/2W | 5% | ZENER DIODE 5% .5W |
| Z7 | 43V | 1/2W | 5% | ZENER DIODE 5% .5W |
| Z8 | 5.1V | 1/2W | 5% | ZENER DIODE 5% .5W |

Figures 4, 4A:
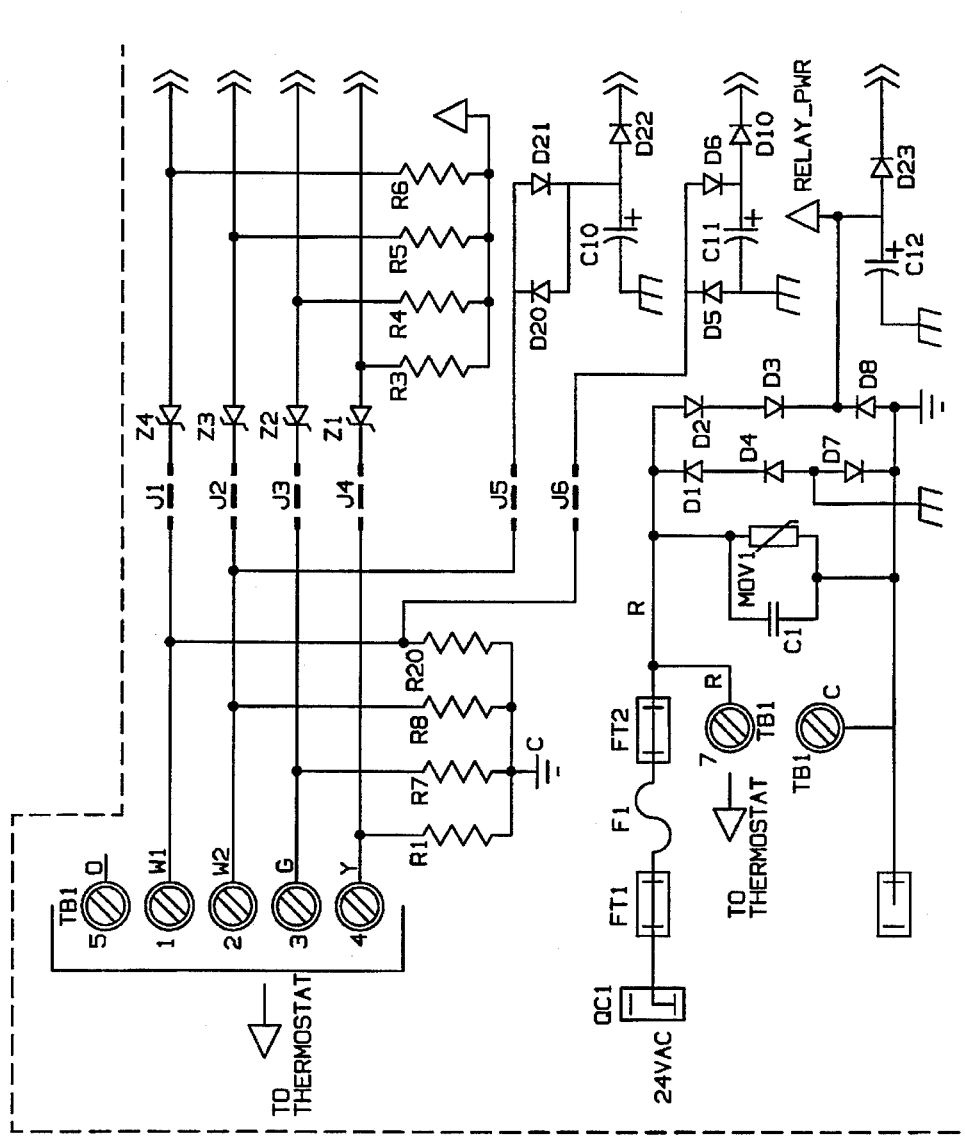
FIG. 4 shows the arrangement of FIGS. 4a and 4b which are portions of a single schematic of a system made in accordance with a second embodiment of the invention, FIG. 4a showing a portion of a thermostat interface and power supply circuit and FIG. 4b showing the remaining portion of the FIG. 4a circuit, a microprocessor and a relay output circuit.
Figure 4B:
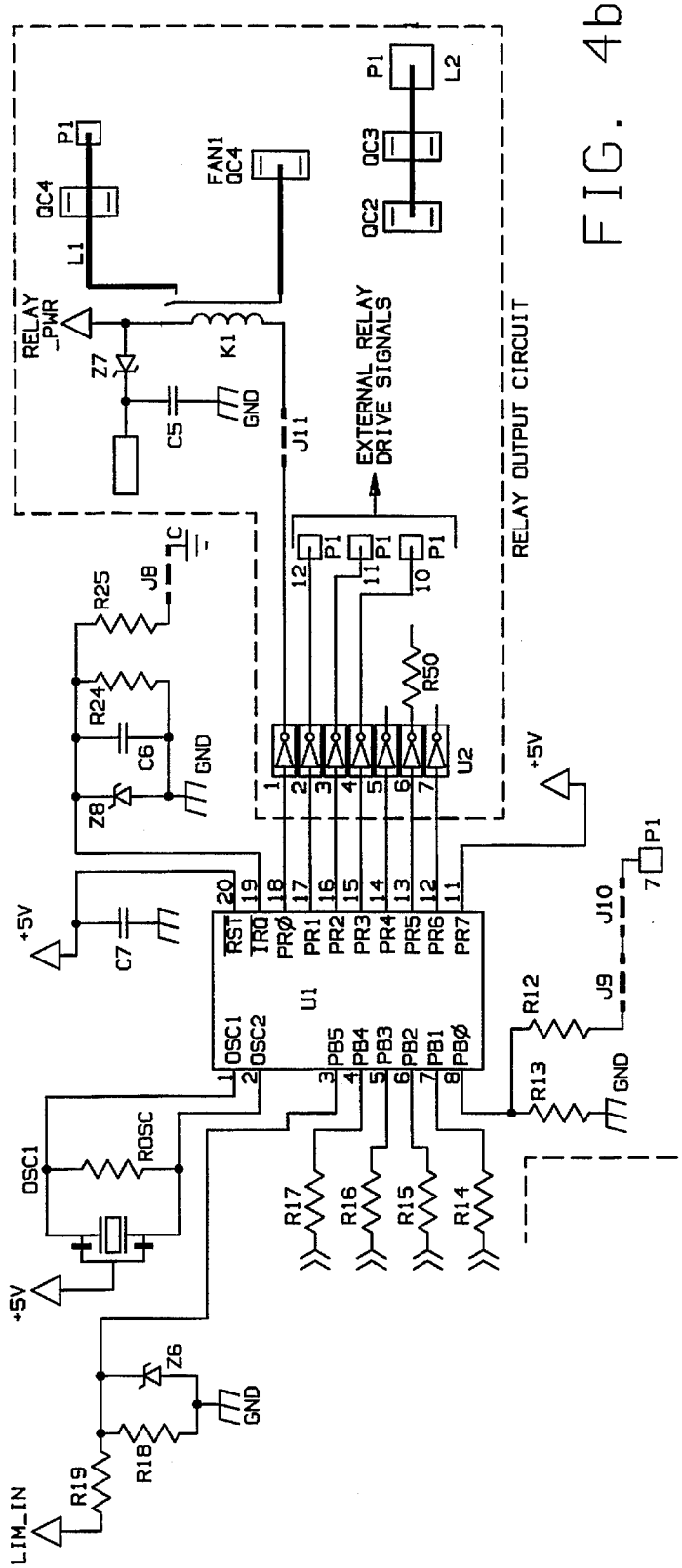
Figure 4B:
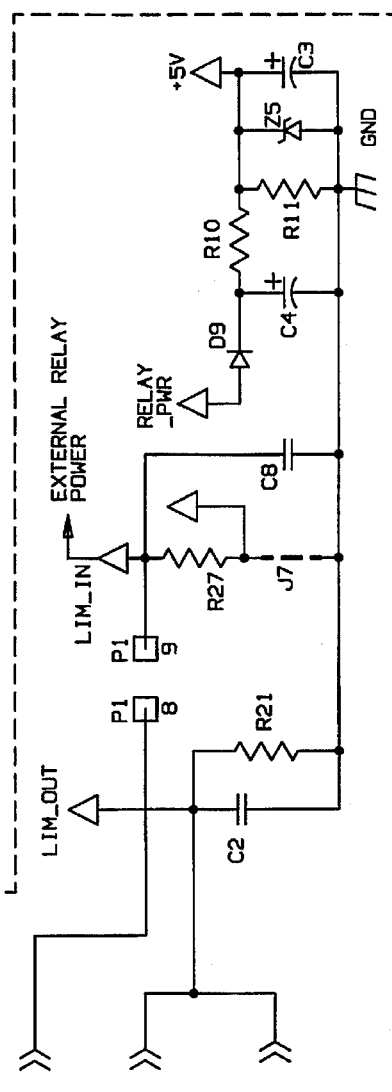

With reference to FIGS. 4a, 4b, a second embodiment of the invention will now be discussed. Most of the components and their reference designators are identical to those of FIGS. 3a, 3b and their description need not be repeated. In the FIGS. 3a, 3b embodiment, current is drawn through the W1 anticipator resistor to a balanced bridge W1 to supply relay drive power. Only a very small current is drawn through the W2 anticipator resistor. The FIGS. 4a, 4b embodiment allows the W2 anticipator resistor to more evenly share the power supply load current with the W1 anticipator. The power supply is also more evenly staged so that the RMS voltage of the power supply is somewhat proportional to the number of operating relays. The R, W1, and W2 signals all drive independent stages. All relays will be on when the R, W1, and W2 signals are all active. A reduced number of relays will be on when the R signal and either W1 or W2 signals are active. Only the K1 relay will be on when the R signal is present by itself. Each stage of the power supply adds more capacitance to the circuit, thus increasing the RMS voltage as the power requirements increase. This allows the relays to have the voltage they need to pull in without having excessive heat generated.

In stage one of the power supply, diodes D1, D4, D7, D2, D3, and D8 form an unbalanced bridge rectifier that produces the pulsed DC signal called RELAY_PWR. Capacitor C12 increases the RMS voltage of RELAY_PWR which is then coupled through diode D23 to the LIM_OUT signal. In the second stage of the power supply, capacitor C11 is placed across a bridge rectifier consisting of diodes D5, D6, D7, and D8 that draws current through the W1 anticipator. The positive side of capacitor C11 is then routed through diode D10 to supplement the LIM_OUT voltage. In the third stage of the power supply, capacitor C10 is placed across a bridge rectifier consisting of diodes D20, D21, D7, and D8 that draws current through the W2 anticipator. The positive side of capacitor C10 is then routed through diode D22 to supplement the LIM_OUT voltage. LIM_OUT is further filtered by capacitor C2 and resistor R21 and then sent out of P1, pin 8 through an external thermal limit switch to P1, pin 9 to become the LIM_IN signal, which is further filtered by capacitor C8 and Resistor R27. Thus, as in the FIGS. 3a, 3b embodiment, relay power signals are merged together through diode logic to form a single relay power signal. The contribution of each of the several signals of the FIGS. 4a, 4b embodiment changing according to the number of relays engaged and the particular setting of the AR1, AR2 anticipator resistors.

The microprocessor and related circuitry is the same as in the FIGS. 3a, 3b embodiment with the exception that resistor R19 is connected to a signal called LIM_IN instead of 24VC1. Those two signals have the same purpose, but have different names.

With regard to the relay output circuitry, relay K1 in the FIGS. 4a, 4b embodiment drives an external fan where relay K1 drove an external heater element in the FIGS. 3a, 3b embodiment. There are no relays built into the circuit board of the FIGS. 4a, 4b embodiment for driving external heater banks. U2 is a relay drive chip used to buffer the microprocessor output signals. U2 drives up to six external relays through connector P1, pins 10–12. The increased number of relays is only possible because of the improved power supply.

The 500 ohm parallel combination of resistors R28, R29 to 24VC2 in the FIGS. 3a, 3b embodiment is replaced by resistor R50 in the FIGS. 4a, 4b embodiment. Resistor R50 is used for test purposes only. This circuit wastes no power, whereas resistors R28, R29 wasted approximately 1.1 watts.

A temperature control system made in accordance with FIG. 4 comprises the following components:

| | | | | |
|---|---|---|---|---|
| C1 | .1uF | 100VDC | 20% | .1 uF, 100 V FILM CAP |
| C2 | .1uF | 100VDC | 20% | .1 uF, 100 V FILM CAP |
| C3 | 10uF | 16V | 5% | 10uF ELECTL RAD CAPS |
| C4 | 47uF | 50V | 20% | 47uF ELECTL RAD CAPS |
| C5 | .1uF | 100VDC | 20% | .1 uF, 100 V FILM CAP |
| C6 | .01uF | 50V | 20% | CERM CAP Z5U .01 |
| C7 | .1uF | 50V | 20% | CERM CAP ZSU .1 |
| C8 | .1uF | 100VDC | 20% | .1 uF, 100 V FILM CAP |
| C10 | 47uF | 50V | 20% | 47uF ELECTL RAD CAPS |
| C11 | 47uF | 50V | 20% | 47uF ELECTL RAD CAPS |
| C12 | 47uF | 50V | 20% | 47uF ELECTL RAD CAPS |
| D1 | 1N4007 | 1AMP | | 1N4007 |
| D2 | 1N4007 | 1AMP | | 1N4007 |
| D3 | 1N4007 | 1AMP | | 1N4007 |
| D4 | 1N4007 | 1AMP | | 1N4007 |
| D5 | 2N4007 | 1AMP | | 1N4007 |
| D6 | 1N4007 | 1AMP | | 1N4007 |
| D7 | 1N4007 | 1AMP | | 1N4007 |
| D8 | 1N4007 | 1AMP | | 1N4007 |
| D9 | 1N4007 | 1AMP | | 1N4007 |
| D10 | 1N4007 | 1AMP | | 1N4007 |
| D20 | 1N4007 | 1AMP | | 1N4007 |
| D21 | 1N4007 | 1AMP | | 1N4007 |
| D22 | 1N4007 | 1AMP | | 1N4007 |
| D23 | 1N4007 | 1AMP | | 1N4007 |
| FT1 | 1/4 FVERT | | | VERT FUSE TERMINAL |
| FT2 | 1/4 FVERT | | | VERT FUSE TERMINAL |
| F1 | 5AMP | | | 5 AMP FUSE |
| K1 | T9ASPST | 22V | | RELAY, SPST PCB MOUNT T9A |
| MOV1 | S05K35 | 35V | | MOV FOR 24VAC APPS (SIEMENS) |
| ROSC | 39K | 1/8W | 5% | RES, 1/8W, 5% |
| R1 | 1.5K | 2W | 5% | RES, 2W, 5% |
| R3 | 10K | 1/8W | 5% | RES, 1/8W, 5% |
| R4 | 10K | 1/8W | 5% | RES, 1/8W, 5% |
| R5 | 10K | 1/8W | 5% | RES, 1/8W, 5% |
| R6 | 10K | 1/8W | 5% | RES, 1/8W, 5% |
| R7 | 1.5K | 2W | 5% | RES, 2W, 5% |
| R8 | 1.5K | 2W | 5% | RES, 2W, 5% |
| R10 | 1.5K | 2W | 5% | RES, 2W, 5% |
| R11 | 2K | 1/8W | 5% | RES, 1/8W, 5% |
| R12 | 100K | 1/8W | 5% | RES, 1/8W, 5% |
| R13 | 51K | 1/8W | 5% | RES, 1/8W, 5% |
| R14 | 100K | 1/8W | 5% | RES, 1/8W, 5% |

-continued

| | | | | |
|---|---|---|---|---|
| R15 | 100K | 1/8W | 5% | RES, 1/8W, 5% |
| R16 | 100K | 1/8W | 5% | RES, 1/8W, 5% |
| R17 | 100K | 1/8W | 5% | RES, 1/8W, 5% |
| R18 | 51K | 1/8W | 5% | RES, 1/8W, 5% |
| R19 | 10.0K | 1/4W | 1% | RES, 1/4W, 1% |
| R20 | 1.5K | 2W | 5% | RES, 2W, 5% |
| R21 | 10.0K | 1/4W | 1% | RES, 1/4W, 1% |
| R24 | 10K | 1/8W | 5% | RES, 1/8W, 5% |
| R25 | 10K | 1/8W | 5% | RES, 1/8W, 5% |
| R27 | 10.0K | 1/4W | 1% | RES, 1/4W, 1% |
| R50 | 100K | 1/8W | 5% | RES, 1/8W, 5% |
| U1 | 68HC05J1 | 6EH | | 6EH MICROCONTROLLER REV B1 |
| U2 | ULN2003A | 50V | | ULN 2003A RELAY DRIVER |
| Z1 | 12V | 1/2W | 5% | ZENER DIODE 5% .5W |
| Z2 | 12V | 1/2W | 5% | ZENER DIODE 5% .5W |
| Z3 | 12V | 1/2W | 5% | ZENER DIODE 5% .5W |
| Z4 | 12V | 1/2W | 5% | ZENER DIODE 5% .5W |
| Z5 | 5.1V | 1/2W | 5% | ZENER DIODE 5% .5W |
| Z6 | 5.1V | 1/2W | 5% | ZENER DIODE 5% .5W |
| Z7 | 43V | 1/2W | 5% | ZENER DIODE 5% .5W |
| Z8 | 5.1V | 1/2W | 5% | ZENER DIODE 5% .5W |

Numerous variations and modifications of the invention will become readily apparent to those familiar with furnace controls. The invention should not be considered as limited to the specific embodiments depicted, but rather is defined in the appended claims.

What is claimed:

1. A temperature control having a plurality of electric relays each having a coil with electrical contacts controlled by energization of the respective relay coil, a microprocessor for controlling energization of the plurality of electric relays, a power supply comprising a low voltage source connected between an R line and earth ground C, a thermostat having first and second switches and respective serially connected first and second anticipator resistors respectively forming W1 and W2 signal lines, the R line also connected to each of the switches, the W1 and W2 signal lines connected to inputs of the microprocessor through current limiting resistors, a first bridge rectifier having an input and an output, the input connected to the R line and the output connected to a relay power signal line to each of the relay coils under the control of output signals from the microprocessor for energizing the relay coils, a first additional bridge rectifier having an input and output, the input of the first additional bridge rectifier connected to the W1 signal line and the output of the first additional bridge circuit connected to the relay power signal line to at least one of the relay coils whereby current will be drawn through the first anticipator resistor to form part of the relay drive power of said at least one of the relay coils.

2. A temperature control system according to claim 1 further comprising a second additional bridge rectifier having an input and an output, the input of the second additional bridge rectifier connected to the W2 signal line and the output of the second additional bridge rectifier connected to at least one other of the relay coils.

3. A temperature control system according to claim 1 in which the first bridge rectifier is unbalanced and the first additional bridge rectifier is balanced.

4. A temperature control system according to claim 2 in which the first bridge rectifier is unbalanced and the first and second additional bridge rectifiers are balanced.

5. A temperature control system according to claim 3 in which the first bridge rectifier has four legs with two serially connected diodes in each of two legs and a single diode in each of two legs.

6. A temperature control system according to claim 4 in which the first bridge rectifier has four legs with two serially connected diodes in each of two legs and a single diode in each of two legs.

7. A temperature control system according to claim 1 further comprising a capacitor connected across each of the first bridge rectifier and the first additional bridge rectifier to increase the RMS voltage of the output of the respective bridge rectifiers.

8. A temperature control system according to claim 2 further comprising a capacitor connected across each of the first, first additional, and second additional bridge rectifiers to increase the RMS voltage of the outputs of the respective bridge rectifiers.

9. A temperature control system having a plurality of electric relays each having a coil with electrical contacts controlled by energization of the respective relay coil, a microprocessor for controlling energization of the plurality of electric relays, a power supply comprising a low voltage source connected between an R line and earth ground C, a thermostat having first and second switches serially connected to first and second anticipator resistors respectively forming W1 and W2 lines, the power source line R connected to the switches, the W1 and W2 lines connected to inputs of the microprocessor through current limiting resistors, a first bridge rectifier having an input and an output, the low voltage AC source coupled to the input of the first bridge rectifier with the output of the bridge rectifier connected to the relay coils under the control of output signals of the microprocessor and an additional bridge rectifier, the W1 line being connected through the additional bridge rectifier to the relay coils whereby anticipator current from the first anticipator resistor is drawn through the relay coils in proportion to the number of relay coils energized.

10. A temperature control system according to claim 9 in which the first bridge rectifier is unbalanced and the first additional bridge rectifier is balanced.

11. A temperature control system according to claim 10 in which the first bridge rectifier has four legs and two serially connected diodes in each of two legs and a single diode in each of two legs.

12. A temperature control system having a plurality of electric relays each having a coil with electrical contacts controlled by energization of the respective relay coil, a microprocessor for controlling energization of the plurality of electric relays, a power supply comprising a low voltage AC source connected between an R line and earth ground C, a thermostat having first and second switches and respective serially connected first and second anticipator resistors respectively forming W1 and W2 signal lines, the R line also connected to each of the switches, the W1 and W2 signal lines connected to inputs of the microprocessor through current limiting resistors, a first bridge rectifier having an input and an output, the input connected to the R line and the output connected to first, second, and third relay power signal lines for the relay coils under the control of output signals from the microprocessor for energizing selected relay coils, a first additional bridge rectifier having an input and an output, the input of the first additional bridge rectifier connected to the W1 signal line and the output of the first additional bridge circuit connected to the second relay power signal line of the relay coils whereby current will be drawn through the first anticipator resistor to form part of the second relay power signal.

13. A temperature control system according to claim 12 comprising a second additional bridge rectifier having an input and an output, the input of the second additional bridge rectifier connected to the W2 signal line and the output of the second additional bridge rectifier connected to the third relay power signal line of the relay coils whereby current will be drawn through the second anticipator resistor to form part of the third relay power signal.

14. A temperature control system according to claim 12 in which the first bridge rectifier is unbalanced and the first additional bridge rectifier is balanced.

15. A temperature control system according to claim 12 in which the first bridge rectifier is unbalanced and the first and second additional bridge rectifiers are balanced.

16. A temperature control system according to claim 14 in which the first bridge rectifier has four legs with two serially connected diodes in each of two legs and a single diode in each of two legs.

17. A temperature control system according to claim 15 in which the first bridge rectifier has four legs with two serially connected diodes in each of two legs and a single diode in each of two legs.

18. A temperature control system according to claim 12 further comprising a capacitor connected across each of the first bridge rectifier and the first additional bridge rectifier to increase the RMS voltage of the output of the respective bridge rectifiers.

19. A temperature control system according to claim 12 further comprising a capacitor connected across each of the first, first additional, and second additional bridge claim rectifiers to increase the RMS voltage of the outputs of the respective bridge rectifiers.

* * * * *